United States Patent
Clark et al.

(10) Patent No.: US 9,522,614 B2
(45) Date of Patent: Dec. 20, 2016

(54) VEHICLE SEAT TRACK COVER

(75) Inventors: Kenneth Clark, Howell, MI (US); David Allen, Manchester, MI (US)

(73) Assignee: Johnson Controls Technology Company, Holland, MI (US)

( * ) Notice: Subject to any disclaimer, the term of this patent is extended or adjusted under 35 U.S.C. 154(b) by 110 days.

(21) Appl. No.: 14/009,094

(22) PCT Filed: Apr. 5, 2012

(86) PCT No.: PCT/US2012/032338
§ 371 (c)(1),
(2), (4) Date: Dec. 4, 2013

(87) PCT Pub. No.: WO2012/138869
PCT Pub. Date: Oct. 11, 2012

(65) Prior Publication Data
US 2014/0091610 A1    Apr. 3, 2014

Related U.S. Application Data

(60) Provisional application No. 61/472,502, filed on Apr. 6, 2011.

(51) Int. Cl.
*B60N 2/07*    (2006.01)
*B60N 2/44*    (2006.01)

(52) U.S. Cl.
CPC .............. *B60N 2/07* (2013.01); *B60N 2/0725* (2013.01); *B60N 2/44* (2013.01); *Y10T 156/1052* (2015.01)

(58) Field of Classification Search
CPC ............ B60N 2/44; B60N 2/0725; B60N 2/07
USPC ....................................................... 297/463.1
See application file for complete search history.

(56) References Cited

U.S. PATENT DOCUMENTS

| | | | |
|---|---|---|---|
| 7,152,897 B2* | 12/2006 | Bonnes | B60N 2/072 296/35.1 |
| 8,011,732 B2* | 9/2011 | Lindsay | B60N 2/10 297/463.1 |

FOREIGN PATENT DOCUMENTS

| | | |
|---|---|---|
| CN | 1955036 A | 5/2007 |
| JP | 10 315817 A | 12/1998 |
| JP | 11 255005 A | 9/1999 |
| JP | 2005 008104 A | 1/2005 |
| JP | 2007 083915 A | 4/2007 |

OTHER PUBLICATIONS

Chinese Office Action for CN Application No. 201280026406.6 mailed Apr. 27, 2015, 7 pages.
PCT Notification of Transmittal of the International Search Report and the Written Opinion of the International Searching Authority for PCT No. PCT/US2012/032338 mailed Feb. 28, 2013.

* cited by examiner

*Primary Examiner* — Anthony D Barfield
(74) *Attorney, Agent, or Firm* — Fletcher Yoder, P.C.

(57) ABSTRACT

According to various embodiments, a vehicle seat track cover includes a substrate configured to be positioned over a seat track and a slot formed along the substrate. The slot is configured to facilitate passage of a seat support from the seat track to a vehicle seat.

15 Claims, 4 Drawing Sheets

VEHICLE SEAT TRACK COVER

CROSS REFERENCE TO RELATED APPLICATION

This application claims priority from and the benefit of U.S. Provisional Application Ser. No. 61/472,502, entitled "VEHICLE SEAT TRACK COVER", filed Apr. 6, 2011, which is hereby incorporated by reference in its entirety.

BACKGROUND

The invention relates generally to vehicle interior seating, and more specifically to a seat track cover for a vehicle seat.

Vehicle seating typically includes a seating adjustment system having a seating track and seat supports. In certain seating configurations, the seat supports are configured to travel along seat track, which is mounted to the floor of the vehicle interior. The seat tracks facilitate movement of the vehicle seat in both a forward and rearward direction along a longitudinal axis of the vehicle. For example, the seat may be moved rearwardly to provide a passenger with more leg room.

Certain seat tracks are constructed from metal or another durable material, and may be secured to the floor of the vehicle by a bolted connection, for example. In certain configurations, the seat tracks have a U-shaped configuration, thereby enabling the seat tracks to receive and capture seat supports. The seat supports, in turn, are configured to support the vehicle seat and to facilitate longitudinal movement of the seat relative seat tracks. Unfortunately, U-shaped seat tracks may enable small objects to become confined within the seat track. For example, items such as pencils/pens, food, small toys, etc, may fall into the seat track. Such items may obstruct the movement of the seat supports within the seat tracks. Furthermore, because the seat tracks are positioned beneath the vehicle seat, access to the tracks may be limited, thereby increasing the difficulty associated with removal of the items. Additionally, the seat tracks are frequently narrow which may cause further difficulty in removing obstructing items.

BRIEF DESCRIPTION OF THE INVENTION

The present invention relates to a seat track cover having an outer surface with a show surface and an inner surface. The seat track cover also has a slot formed through the inner surface and through the outer surface, where the slot is configured to receive a seat support.

The present invention also relates to a vehicle interior assembly having a seat track cover. The seat track cover has an outer layer with a show surface and a first slot configured to receive a seat support. The seat track cover further includes an inner layer having a second slot configured to receive the seat support and is aligned with the first slot. The inner layer is coupled to the outer layer and is configured to support the outer layer. The seat track cover is further mountable to a seat track.

The present invention further relates to a method for manufacturing a seat track cover including coupling an outer layer having a show surface to an inner layer and forming a slot through the inner layer and through the outer layer, where the slot is configured to receive a seat support.

DRAWINGS

DETAILED DESCRIPTION

Figure 1:
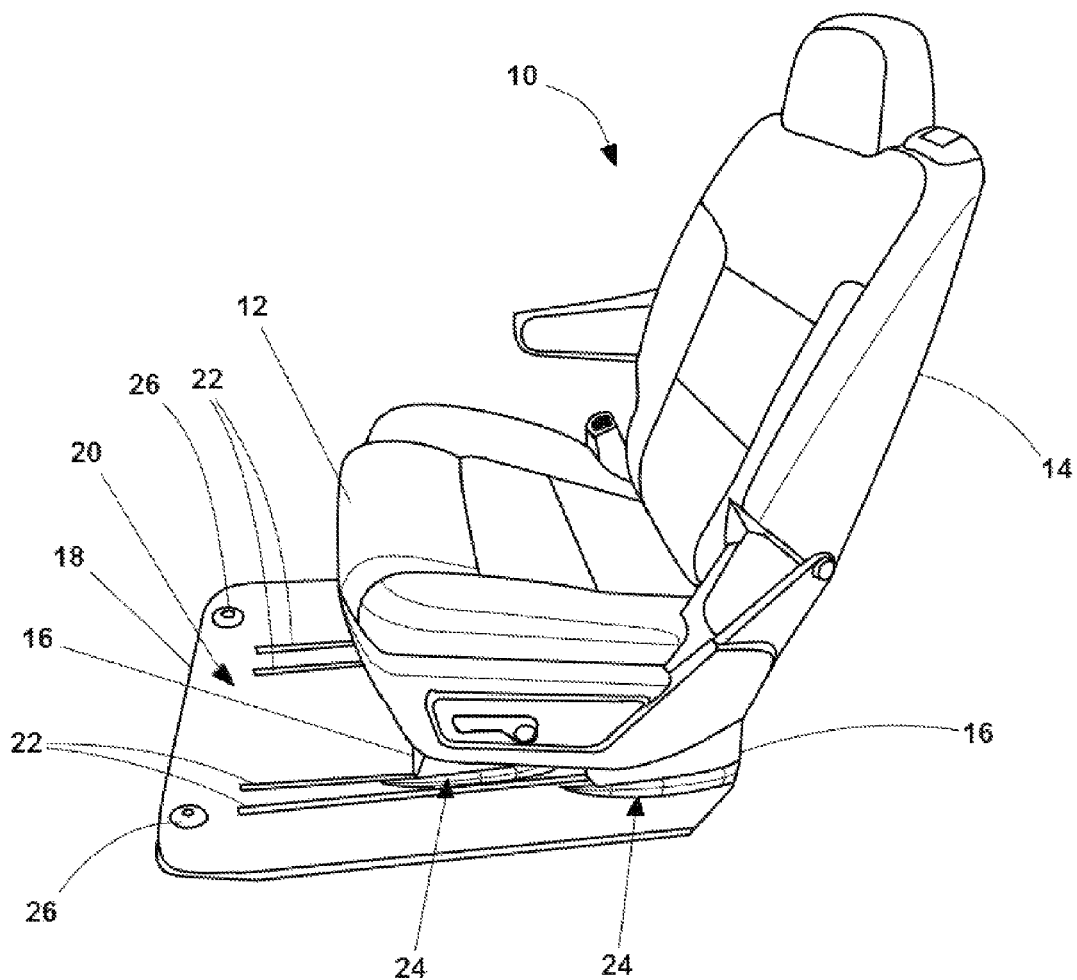
FIG. 1 is perspective view of an exemplary vehicle seat which may travel along a seat track positioned beneath a seat track cover.

FIG. 1 is a perspective view of a vehicle seat 10. As illustrated, the seat 10 includes a seat bottom 12 and a seat back 14. In the illustrated embodiment, the seat bottom 12 includes a seat bottom chassis, one or more cushions, and a fabric covering. The seat cushion serves to provide a comfortable surface on which a passenger may sit while in the vehicle. As will be appreciated, the seat cushion is secured to the seat bottom chassis. The seat bottom 12 may further include a fabric covering disposed about the cushion to provide a desired appearance and/or to protect the internal components of the seat bottom 12. The seat back 14 may be constructed in a similar manner, i.e., from one or more cushions secured to a rigid chassis and wrapped with a fabric covering.

As illustrated, the seat bottom 12 is secured to one or more seat supports 16. As discussed in further detail below, the seat supports 16, in turn, may be disposed within a seat track (not shown). The seat track is secured to the floor of the vehicle and may be made from a metal, such as steel. In certain configurations, the seat 10 may be configured to translate along the seat track to adjust a longitudinal position of a driver or passenger. As will be appreciated, adjustment of the seating position may be either manual or assisted. For example, an electric motor may be configured to drive the seat 10 along the track by a suitable mechanism such as a rack and pinion system. In addition, the seat back 14 may be configured to recline with respect to the seat bottom 12. Adjustment of the seat back 14 may also be either manual or assisted by an electric motor, for example.

In the illustrated embodiment, the seat track is concealed by a seat track cover 18. The seat track cover 18 includes a substrate having an outer layer 20 and an inner support layer. The outer layer 12 includes a show surface which may be constructed from a material such as carpet. As illustrated, the seat track cover 18 includes one or more slots 20 which are configured to receive the seat supports. In the illustrated embodiment, the slots 22 are narrower than the width of the supports 16. Consequently, the edges of the slots 22 are biased toward the seat supports 16, thereby facilitating formation of a lip 24 adjacent to the seat support 16. More particularly, as mentioned above, the vehicle seat 10 may be translated along the seat track to adjust a longitudinal position of a driver or passenger. During this translation, the seat supports 16 may slide through the slots 22 and the seat track cover 18 may envelop or "hug" the seat supports 16. As a result, the seat track cover 18 may substantially reduce or eliminate the possibility of loose falling into the seat tracks and interfering with longitudinal movement of the seat 10. In the illustrated embodiment, the seat track cover 18 is secured to the floor of the vehicle by fasteners 26.

Figure 2:
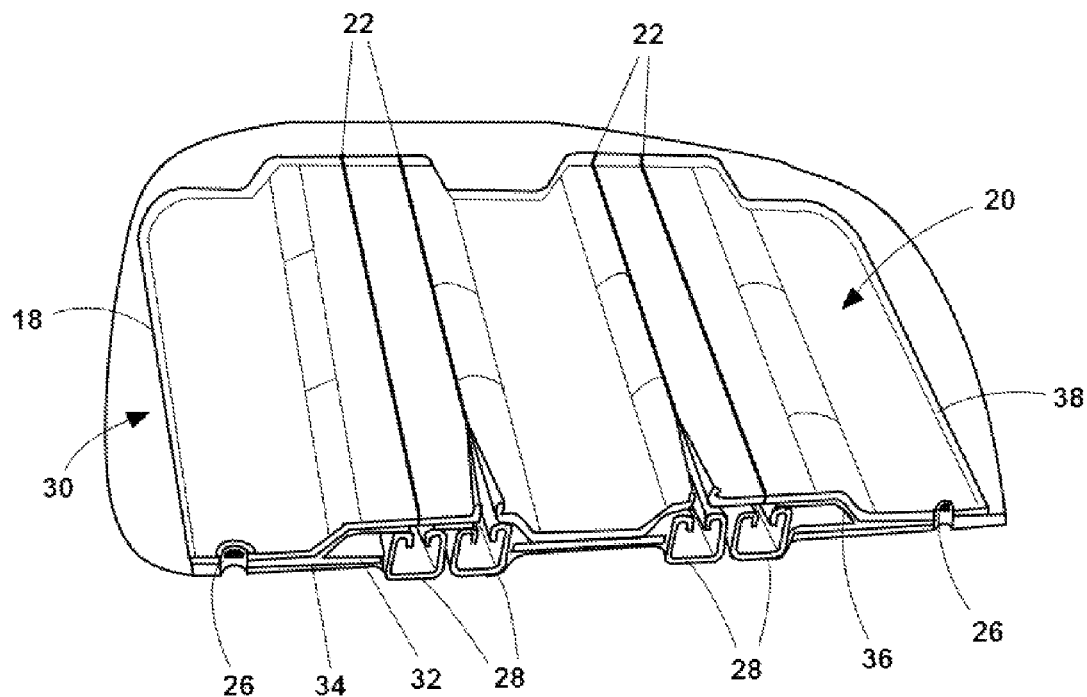
FIG. 2 is a cross-sectional perspective view of an exemplary seat track having a seat track cover.

FIG. 2 is a cross-sectional perspective view of an embodiment of the seat track cover 18 of FIG. 1 installed over seat tracks 28. The seat tracks 28 are configured to receive and capture seat supports 16, and to guide the translation of the seat supports 16 as the driver or passenger adjusts the longitudinal position of the vehicle seat 10. Further, the seat track cover 18 is secured to a vehicle interior floor 30 by fasteners 26. In alternative embodiments, the fasteners 26 may secure the seat track cover 18 to the seat tracks 28. In the illustrated embodiment, the vehicle interior floor 30 includes a cover layer 32, such as a carpeted show surface, and a floor body 34, which may be constructed from sheet metal, for example. The fasteners 26 secure the seat track cover 18 to the cover layer 32 and/or to the floor body 34. For example, the fasteners 26 may include hook and loop fasteners, snap fasteners, clips, pins, clasps, or other coupling devices.

In the illustrated embodiment, the seat track cover 18 includes the outer layer 20 coupled to an inner support layer 36. As mentioned above, the outer layer 20 may include a carpeted show surface to match the cover layer 32 of the vehicle interior floor 30. As will be appreciated, using the same material for the outer layer 20 of the seat track cover 18 and the cover layer 32 of the vehicle interior floor 30 may provide a flush and integrated appearance. As illustrated, the inner layer 36 provides structural support for the outer layer 20. In certain embodiments, the inner layer 36 may be formed to fit the contours and geometry of the seat tracks 28. For example, the inner layer 36 may be constructed from plastic, molded rubber, or another rigid material which may be formed using a molding or stamping process. As discussed in detail below, the outer layer 20 and the inner layer 36 of the seat track cover 18 may be coupled to one another by various mechanical or bonding processes. For example, the outer layer 20 and the inner layer 36 may be bonded using an adhesive, a compression molding process, or a mold behind process. Furthermore, the seat track cover 18 includes an edge 38, defining a perimeter of the seat track cover 18. The edge 38 may formed by a variety of processes, each discussed in detail below. For example, the outer layer 20 may form the edge 38, providing a flush appearance between the seat track cover 18 and the vehicle interior floor 30. Alternatively, the inner layer 36 may form the edge 38, providing a rigid or contrasting trim around a perimeter of the seat track cover 18.

As discussed above, the slots 22 are configured to receive the seat supports 16 of the vehicle seat 10. Further, the slots 22 are formed such that the edges of the slots are biased towards the seat supports 16, thereby blocking loose items from falling beneath the seat track cover 18 and into the seat tracks 28. In certain embodiments, the slots 22 may be formed after the outer layer 20 and the inner layer 36 are coupled together. For example, the slots 22 may be cut using a computer numerically controlled saw or a die cutting press.

Figure 3:
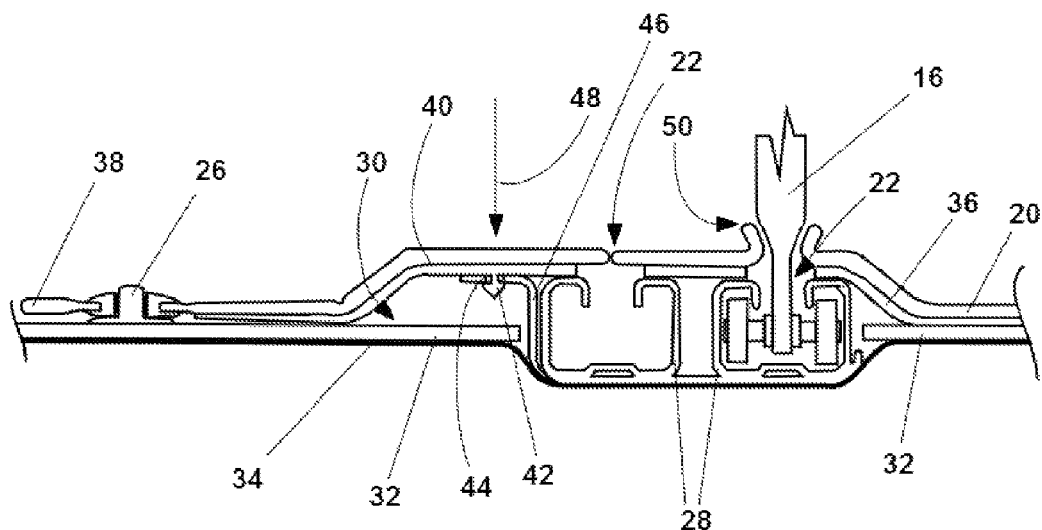
FIG. 3 is a cross-sectional side view of an embodiment of a seat track cover having an outer layer and an inner layer, where the seat track cover is mounted to the floor of the vehicle interior.

FIG. 3 is a partial cross-sectional side view of an embodiment of a seat track cover 18 installed over seat tracks 28. The illustrated embodiment includes a seat track cover 18 having an outer layer 20 and an inner layer 36 bonded to one another by an adhesive connection 40. For example, the adhesive 40 may be a glue, epoxy, or other bonding agent. In certain embodiments, the inner layer 36 is formed from a polymer, such as plastic, which may be molded before the inner layer 36 is bonded to the outer layer 20 with the adhesive 40. The outer layer 20 may also be pre-formed before the outer layer 20 is bonded to the inner layer 36 with the adhesive 40. Alternatively, the outer layer 20 may be bonded to the inner layer 36 first, and then the assembly may be cut or trimmed, as required. After the outer layer 20 and the inner layer 36 have been bonded by the adhesive 40, the slots 22 may be formed such that the slots align with the seat tracks 28.

As discussed above, the inner layer 36 may be composed of a polymer, such as plastic, or other semi-rigid material to provide structural support for the outer layer 20. In the illustrated embodiment, the inner layer 36 also includes a molded fastener 42. The molded fastener 42 is integrated with the inner layer 36 and formed from the same material as the inner layer 36. For example, the inner layer 36 and the molded fastener 42 may be formed and cured together in the same mold. Alternatively, the inner layer 36 and the molded fastener 42 may be formed and cured separately and subsequently coupled to one another by an adhesive connection or a melt bonding process. The molded fastener 42 is configured to secure the seat track cover 18 to the seat tracks 28. Specifically, the molded fastener 42 is configured to engage an aperture 44 in a flange 46 of the seat track 28. The aperture 44 may be formed by a cutting, punching, or other machining process. During installation of the seat track cover 18, the cover may be placed over the seat tracks 28 such that the slots 22 of the seat track cover 18 are aligned with the seat tracks 28. With the seat track cover 18 in place, cover 18 may be driven downwardly in a direction 48, thereby inducing the molded fastener 42 to engage the aperture 44 and establishing a connection between the molded fastener 42 and the flange 46 of the seat tracks 28. While the illustrated embodiment includes a single molded fastener 42, other embodiments may include multiple molded fasteners 42 (e.g., 2, 3, 4, 5, 6, or more). Similarly, certain embodiments may include molded fasteners 42 having different configurations and geometries, as discussed below.

As discussed above, the slots 22 in the seat track cover 18 are formed such that the edges of the slots are biased toward the seat supports 16. As illustrated, the seat track cover 18 may fold, bend, or overlap where the seat track cover 18 contacts the seat supports 16, thereby forming a lip 50. As will be appreciated, contact between the edges of the slots and the seat supports 16 forms a barrier that blocks loose objects from entering the seat tracks 28.

Figure 4:
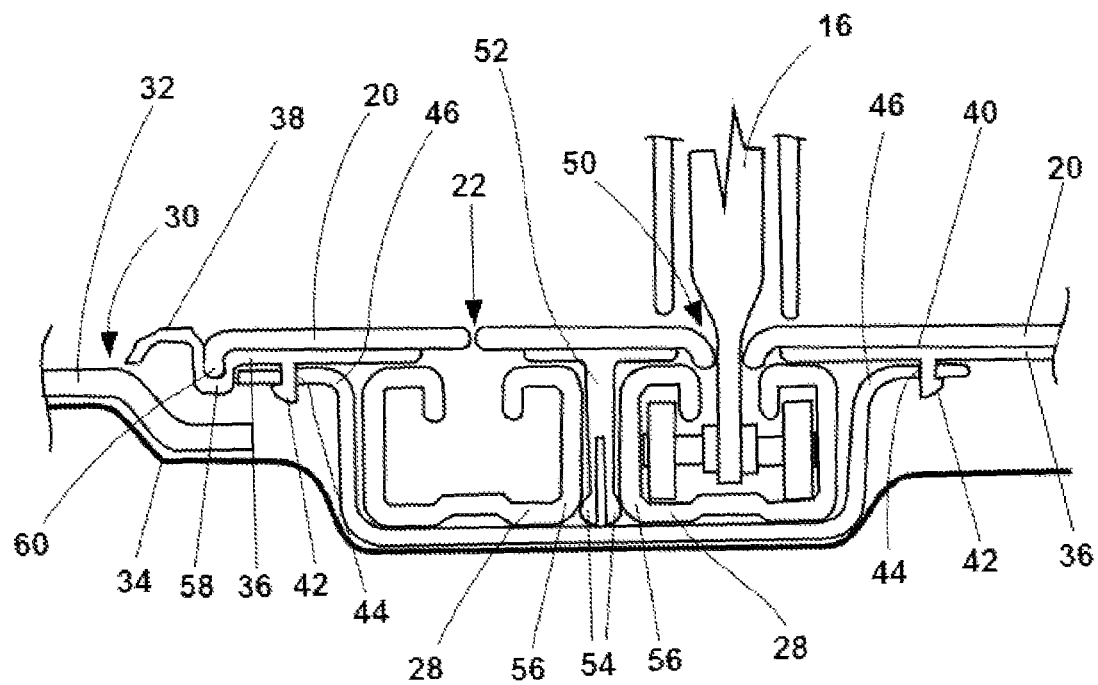
FIG. 4 is a cross-sectional side view of another embodiment of a seat track cover having an outer layer and an inner layer, where the inner layer forms a perimeter of the seat track cover and the outer layer is coupled to the inner layer by an adhesive connection.

FIG. 4 is a cross-sectional side view of another embodiment of a seat track cover 18 having an outer layer 20 and an inner layer 36, where the inner layer forms a perimeter of the seat track cover and the outer layer is coupled to the inner layer by an adhesive connection. The inner layer 36 further includes the molded fasteners 42 having an alternative configuration. As discussed above, the molded fasteners 42 are configured to engage the apertures 44 of the flanges 46, thereby securing the seat track cover 18 to the seat tracks 28. Moreover, the illustrated embodiment includes an additional molded fastener 52 configured to directly engage the seat tracks 28. Specifically, the molded fastener 52 includes tabs 54 configured to engage recesses formed adjacent to base corners 56 of the seat tracks 28. The molded fastener 52 serves to further secure the seat track cover 18 to the seat tracks 28. As will be appreciated, the additional molded fastener 52 may block the seat track cover 18 from shifting or moving during movement of the seat supports 16 along the seat tracks 28. While only one additional fastener 52 is included in the illustrated embodiment, other embodiments may include multiple fasteners 52 (e.g., 2, 3, 4, 5, 6, or more).

As mentioned above, the illustrated embodiment includes an edge 38 formed by the inner layer 36. In particular, the inner layer 36 forms a recess 58 configured to receive a border 60 of the outer layer 20. The inner layer 36 extends past the recess 58 to form the edge 38. The edge 38 serves to establish a trim around a perimeter of the seat track cover 18.

Figure 5:
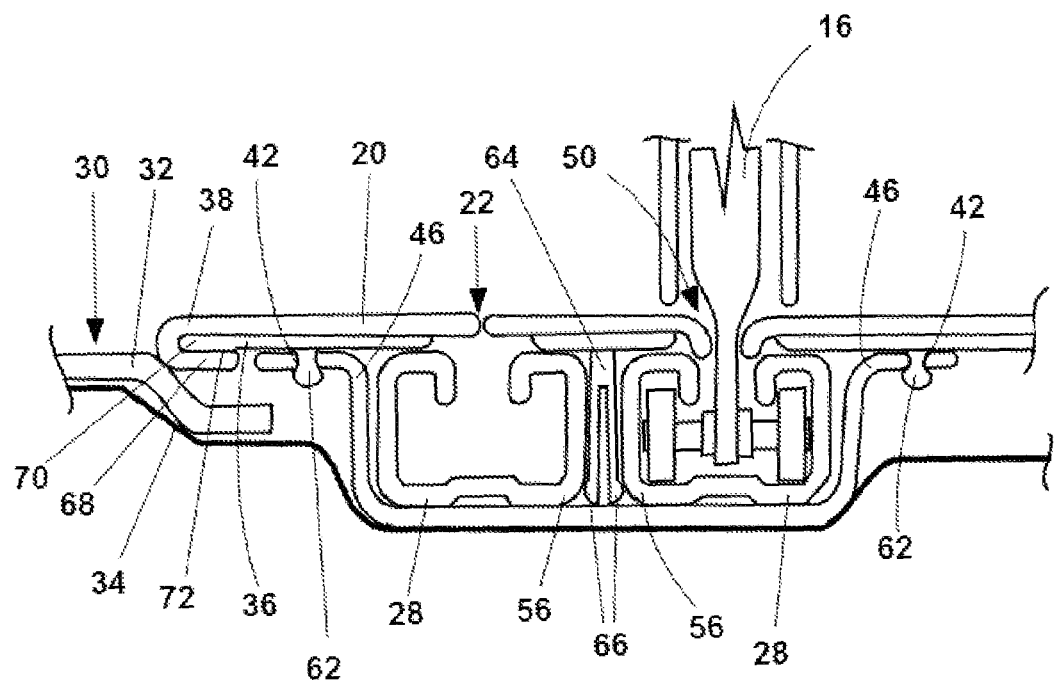
FIG. 5 is a cross-sectional side view of another embodiment of a seat track cover having an outer layer and an inner layer, where the outer layer forms a perimeter of the seat track cover and the inner layer is laminated to the outer layer via a compression molding process.

FIG. 5 is a cross-sectional side view of another embodiment of a seat track cover 18 having an outer layer 20 and an inner layer 36, where the outer layer forms a perimeter of the seat track cover and the inner layer is laminated to the outer layer via a compression molding process. The compression molding process includes placing the inner layer 36 and the outer layer 20 into a mold, and compressing the layers at elevated temperatures to form a completed part. Once the compression mold process is complete, the resulting seat track cover 18 may be removed from the compression tool. Thereafter, the slots 22 may be formed in the seat track cover 18 by a computer numerically controlled saw, or a die cutting press. In the illustrate embodiment, the seat track cover 18 includes bonded clips 62 and 64. For example, the bonded clips 62 and 64 may be constructed from steel, aluminum, plastic and/or other suitable materials. Further, the clips 62 and 64 may be bonded to the inner layer 36 using the compression tool, or an adhesive connection. As the seat track cover 18 is installed over the seat tracks 28, the clips 62 engage the apertures 44, thereby securing the seat track cover 18 to the seat tracks 28. Similarly, the bonded clip 64 includes tabs 66 which, as the seat track cover 18 is installed, pass between the seat tracks 28 and engage recesses adjacent to the base corners 56 of the seat tracks 28, further securing the seat track cover 18 to the seat tracks 28.

In the illustrated embodiment, the edge 38 of the seat track cover 18 is formed by the outer layer 20. Specifically, an end portion 68 of the outer layer 20 is folded over a border 70 of the inner layer 36, and secured to an underside 72 of the inner layer 36. In certain embodiments, the end portion 68 may be secured to the underside 72 by an adhesive. Alternatively, the end portion 68 may be bonded to the underside 68 during the compression molding process. Forming the edge in this manner may provide a flush and integrated appearance, particularly when the cover layer 32 and the outer layer 20 are made from the same material.

Figure 6:
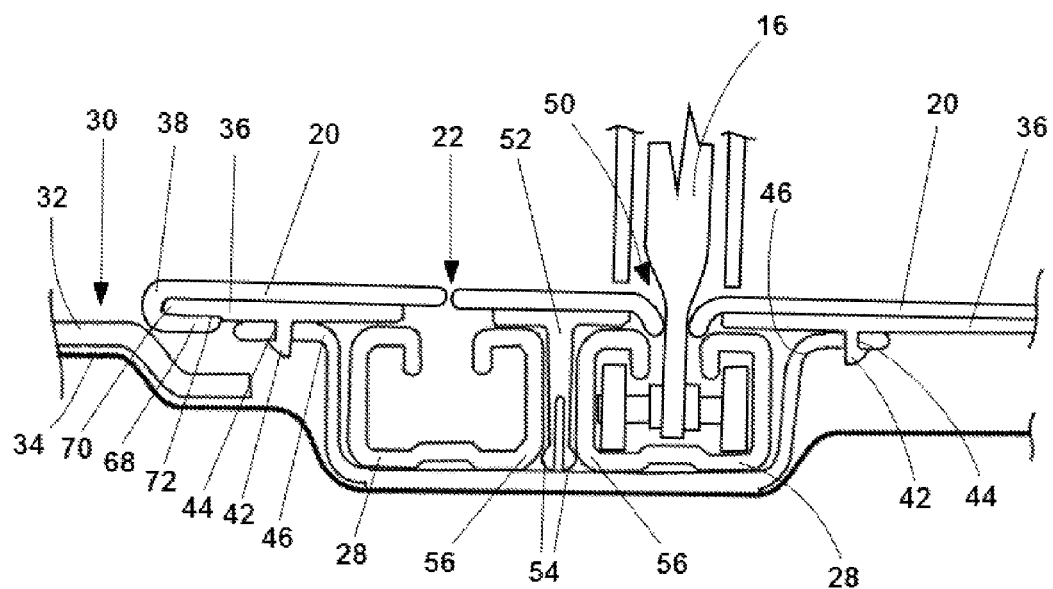
FIG. 6 is a cross-sectional side view of another embodiment of a seat track cover having an outer layer and an inner layer, where the inner layer is molded behind the outer layer.

FIG. 6 is a cross-sectional side view of another embodiment of a seat track cover 18 having an outer layer 20 and an inner layer 36, where the inner layer is molded behind the outer layer. Specifically, the mold behind process includes lining an injection molding tool with the outer layer 20, closing the injection molding tool, and injecting a liquid polymer foam into the tool to form the inner layer 36. The injection molding tool may be further configured to form the molded fasteners 42 and 52. After the foam hardens and cures to form the inner layer 36, the completed seat track cover 18 may be removed from the tool. Once the seat track cover 18 is removed, the slots 22 may be formed using a computer numerically controlled saw or die cutting press, for example. Moreover, in the illustrated embodiment, the edge 38 is formed by the outer layer 20. After the seat track cover 18 is removed from the injection molding tool, the end portion 68 of the outer layer 20 is folded over and secured to the underside 72 of the inner layer 36 by an adhesive connection, for example.

Figure 7:
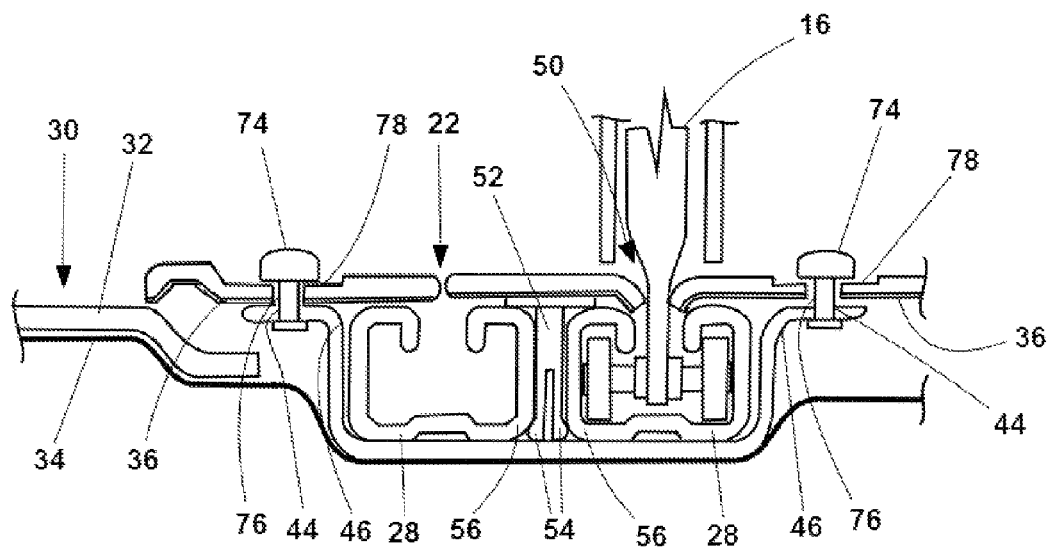
FIG. 7 is a cross-sectional side view of another embodiment of a seat track cover having an outer layer and an inner layer, where the seat track cover is coupled to the seat track by fasteners.

FIG. 7 is a cross-sectional side view of another embodiment of a seat track cover 18 having an outer layer 20 and an inner layer 36, where the seat track cover is coupled to the seat track by fasteners. Similar to the embodiment described above with reference to FIG. 6, the seat track cover is formed by a mold behind process. Specifically, the outer layer 20 is placed within a molding tool and liquid rubber is injected behind the outer layer. The rubber hardens and cures to form the inner layer 36, which bonds to the outer layer 20, thereby forming the seat track cover 18. The illustrated embodiment also includes the fastener 54 which may be separately formed (e.g., from a polymer molding process) and then bonded to the inner layer 36. For example, the fastener 54 may be bonded to the inner layer 36 within the molding tool or via an adhesive. After the seat track cover 18 is removed from the molding tool, the slots 22 may be formed using a computer numerically controlled saw or die cutting press.

In the illustrated embodiment, the seat track cover 18 is further secured to the seat tracks 28 by fasteners 74. For example, the fasteners 74 may be pins, clips, pegs, rivets, or other coupling devices. As illustrated, the seat track cover 18 includes apertures 76 configured to receive the fasteners 74. The apertures 76 may be formed by a die cut process, a punching process, or another machining process. Further, the apertures 76 may include grommets 78. To secure the seat track cover 18 to the seat tracks 18, the fasteners 74 pass through the apertures 76 and further through the apertures 44 formed in the flanges 46 of the seat tracks 28. The fasteners 74 interlock with the flanges 46, thereby securing the seat track cover 18 to the seat tracks 28 and blocking movement of the seat track cover 18 as the seat supports 16 travel within the slots 22 along the seat tracks 28.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A seat track cover, comprising:
   a substrate configured to be positioned over a seat track, wherein the substrate comprises:

an outer layer having an outer surface; and an inner layer having an inner surface, wherein the inner layer is coupled to the outer layer, and wherein the substrate comprises a fastener configured to extend through and engage with an aperture of a flange adjacent to the seat track to couple the substrate to the seat track; and a slot formed along the substrate, wherein the slot is configured to facilitate passage of a seat support from the seat track to a vehicle seat.

2. The seat track cover of claim 1, wherein the fastener is integral with the inner layer.

3. The seat track cover of claim 2, wherein the inner layer is coupled to the outer layer by a compression molding process.

4. The seat track cover of claim 2, wherein the inner layer is coupled to the outer layer by a mold behind process.

5. A seat track cover, comprising:

an outer layer having a show surface and a first slot configured to receive a seat support; and an inner layer configured to support the outer layer, wherein the inner layer is coupled to the outer layer, the inner layer includes a second slot configured to receive the seat support, the second slot is aligned with the first slot;

wherein the seat track cover is mountable to a seat track via a fastener configured to extend through an aperture of a flange adjacent to the seat track to secure the seat track cover over the seat track.

6. The seat track cover of claim 5, wherein the show surface of the outer layer comprises carpet.

7. The seat track cover of claim 5, wherein the inner layer is formed from plastic.

8. The seat track cover of claim 7, wherein the inner layer comprises a molded plastic fastener configured to engage the seat track.

9. The seat track cover of claim 5, wherein the inner layer is coupled to the outer layer by an adhesive connection.

10. The seat track cover of claim 5, wherein the inner layer is coupled to the outer layer by a compression molding process.

11. The seat track cover of claim 5, wherein the inner layer is coupled to the outer layer by a mold behind process.

12. The seat track cover of claim 11, wherein the inner layer is formed from a mold behind rubber sheet.

13. The seat track cover of claim 5, wherein the outer layer defines a perimeter of the seat track cover.

14. The seat track cover of claim 5, wherein the inner layer defines a perimeter of the seat track cover.

15. The seat track cover of claim 5, wherein the fastener comprises a bonded metal fastener configured to engage the flange of the seat track.

* * * * *